March 10, 1964     T. H. CALKINS     3,123,954
METHOD OF GRINDING LENSES
Filed June 9, 1961     5 Sheets-Sheet 1

INVENTOR.
TRACY H. CALKINS
BY
Lockwood, Woodard, Smith & Weikart
Attorneys

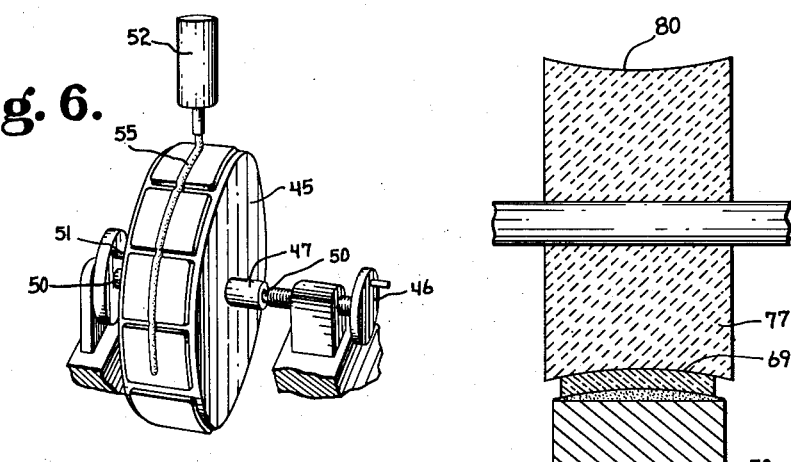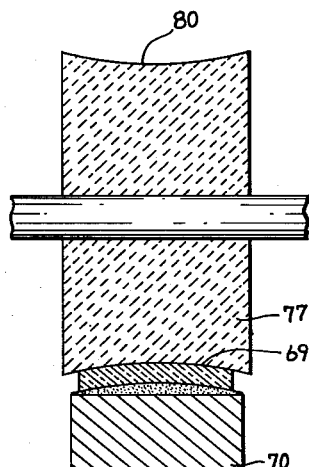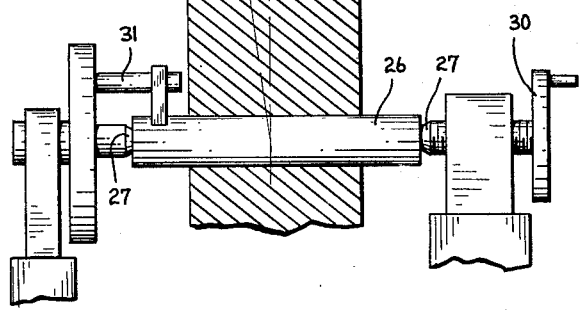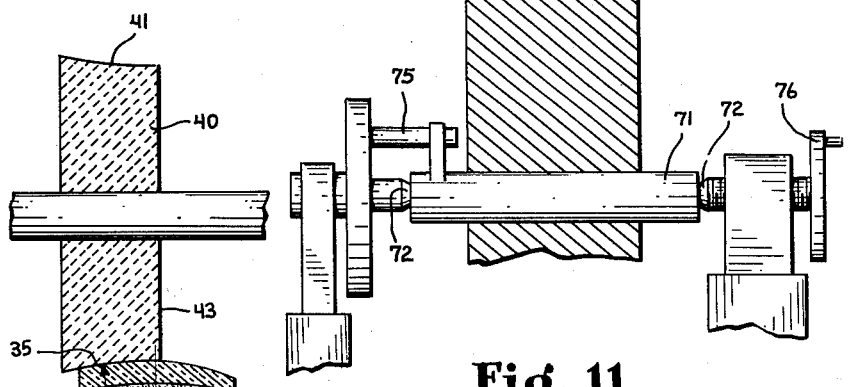

March 10, 1964 T. H. CALKINS 3,123,954
METHOD OF GRINDING LENSES
Filed June 9, 1961 5 Sheets-Sheet 3

INVENTOR.
TRACY H. CALKINS
BY
Lockwood, Woodard, Smith & Weikart
Attorneys

March 10, 1964   T. H. CALKINS   3,123,954
METHOD OF GRINDING LENSES
Filed June 9, 1961   5 Sheets-Sheet 4

INVENTOR.
TRACY H. CALKINS
BY
Lockwood, Woodard, Smith & Weikart
Attorneys

March 10, 1964     T. H. CALKINS     3,123,954
METHOD OF GRINDING LENSES

Filed June 9, 1961     5 Sheets-Sheet 5

INVENTOR.
TRACY H. CALKINS
BY
Lakwood, Woodard, Smith & Weikart
Attorneys

United States Patent Office 3,123,954
Patented Mar. 10, 1964

3,123,954
METHOD OF GRINDING LENSES
Tracy H. Calkins, Indianapolis, Ind., assignor, by mesne assignments, to Textron Inc., Providence, R.I., a corporation of Rhode Island
Filed June 9, 1961, Ser. No. 116,013
9 Claims. (Cl. 51—284)

This invention relates to an improved method or process of forming glass and finds a primary utility as an improved method for making a one-piece multifocal lens blank which may be finally processed into a prescription lens, said lens blank having fields of different power joined by a straight line, reference being had to the Bifocal Lens Blank and Method of Making the Same disclosed in Letters Patent 1,951,506 to Frank E. Duckwall, as also disclosed in Letters Patent 2,847,804 to Tracy H. Calkins and Thomas S. Hood and as disclosed in patent application 843,765, filed October 1, 1959, now Patent No. 3,066,568, granted December 4, 1962, to William M. Catron et al., inventors.

As disclosed in the above mentioned patent application, one procedure for forming lens blanks includes the mounting of a plurality of unfinished molded blanks of optical glass along the circumferential periphery of a blocking wheel with the convex surface of each unfinished blank facing radially outwardly. The blocking wheel, which has a predetermined radius approximating the desired radius of the distance field, is then rotated about its axis and the unfinished lens blanks are ground by a grinding stone wheel also rotating about its axis. This grinding stone wheel has a concave peripheral grinding surface which is formed to the shape of two merging toric sections, one of said sections having a cross radius approximating the desired spherical radius of said distance field and the other of said sections having a cross radius approximating the desired spherical radius of said near field. This grinding is continued until the distance field of each blank is formed to a spherical surface.

The lens blanks are then removed from the blocking wheel and are mounted in similar fashion on a second blocking wheel having a shorter radius than the first blocking wheel. The near field portion of the outwardly facing lens surface is then finish ground to a spherical surface of shorter radius by the use of a second grinding wheel.

In order to complete the grinding of the lenses, it is then necessary to reblock the lenses upon a blocking wheel having a radius equal to the first above described blocking wheel in order that finish grinding of the distance field of the lenses can be accomplished. This added reblocking operation is necessary because of the fact that chips are formed by the near field grinding operation at the juncture of the near and distance fields. Consequently, one object of the present invention is to provide an improved method of making one-piece multifocal lens blanks, said method eliminating one of the reblocking operations previously thought to be necessary in the above described process, yet also eliminating chipping.

A further and more basic object of the present invention is to provide an improved method of forming glass which eliminates or reduces chipping or flaking in the grinding of the glass.

Still another object of the present invention is to provide a more accurate method of producing multifocal lens blanks.

Another object of the present invention is to provide a method of forming lens blanks which eliminates steps heretofore believed to be necessary to the proper manufacture of multifocal lens surfaces.

A further object of the present invention is to provide a new, improved and simplified process of simultaneously producing a plurality of one-piece multifocal lens blanks, said process overcoming the difficulties usually encountered in the relatively complicated and time-consuming prior process of forming each lens blank individually and also overcoming the past difficulties of objectionable glass flaking at the shoulder or shoulders dividing the focal fields of the lens and thus providing a substantial reduction in the time required for the finishing of such lens blanks and, consequently, also providing an increased rate of production nad greater economy.

Still a further object of the present invention is to provide an improved method of making trifocal lens blanks.

Related objects and advantages will become apparent as the description proceeds.

One embodiment of the present invention comprises a method of making a one-piece multifocal lens blank and involves applying epoxy resin to an unfinished blank and grinding the blank through the epoxy resin whereby chipping and flaking of the thus produced shoulder is reduced or eliminated.

The full nature of the invention will be understood from the accompanying drawings and the following description and claims.

FIG. 5 is a central vertical section through a portion of the blocking wheel and means for rotating the wheel of FIG. 4 and additionally shows a further grinding wheel in position for finish grinding the distance vision field or base curve of the lens blanks mounted upon the wheel.

FIG. 6 is a perspective view of a further blocking wheel and for a means for applying epoxy resin to the lens blanks on the wheel during rotation thereof.

FIG. 11 is a view similar to FIG. 4 showing a step of an alternative method of the present invention.

Figure 1:
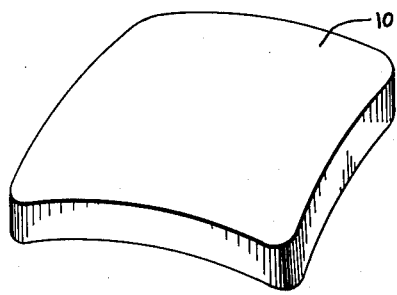
FIG. 1 is a perspective view of an unfinished molded lens blank.
Figure 2:
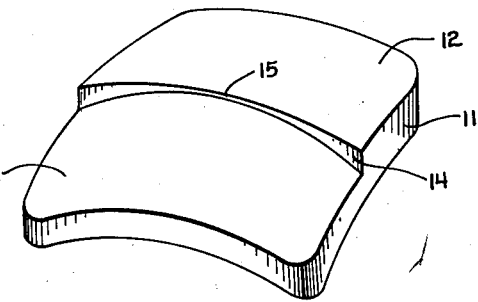
FIG. 2 is a perspective view of a bifocal finished blank following the processing thereof.

The method comprising this invention is illustrated serially by means of the accompanying drawings wherein FIG. 1 shows the unfinished blank 10 of optical glass which is processed, by grinding and polishing the convex surface thereof, into a finished bifocal blank 11, as shown in FIG. 2, having a distance vision field 12 and a near vision or reading field 13 separated by a straight line of demarcation extending transversely from side to side as indicated by the shoulder 14. The two surfaces approach merger centrally of the blank as indicated at 15, the shoulders gradually increasing in depth from the point of near merger to the lateral edges of the blank. For aesthetic and other reasons, it is desirable that there not be complete merger at the point 15 and therefore such lenses are usually formed with from .002 to .010 inch thickness of shoulder at the center point of the lens.

In producing the finished blank of FIG. 2, a grinding wheel 16 must first be formed at its outward peripheral surface 17 into a concave shape in which one portion 18 of the surface 17 has a radius of cross-curvature approximating the desired spherical radius of the distance field or base curve of the lens and in which the other portion 19 of the surface 17 has a shorter radius of cross-curvature approximating the desired spherical radius of the near field of vision or add curve, the two portions merging tangentially at the midpoint of the concave surface 17 of the grinding wheel. It is extremely important that the two portions 18 and 19 meet at exactly the center or midpoint of the grinding wheel, and this result is accomplished by the use of apparatus illustrated in FIG. 3 of and described in the above mentioned patent application of William M. Catron et al.

Figure 3:
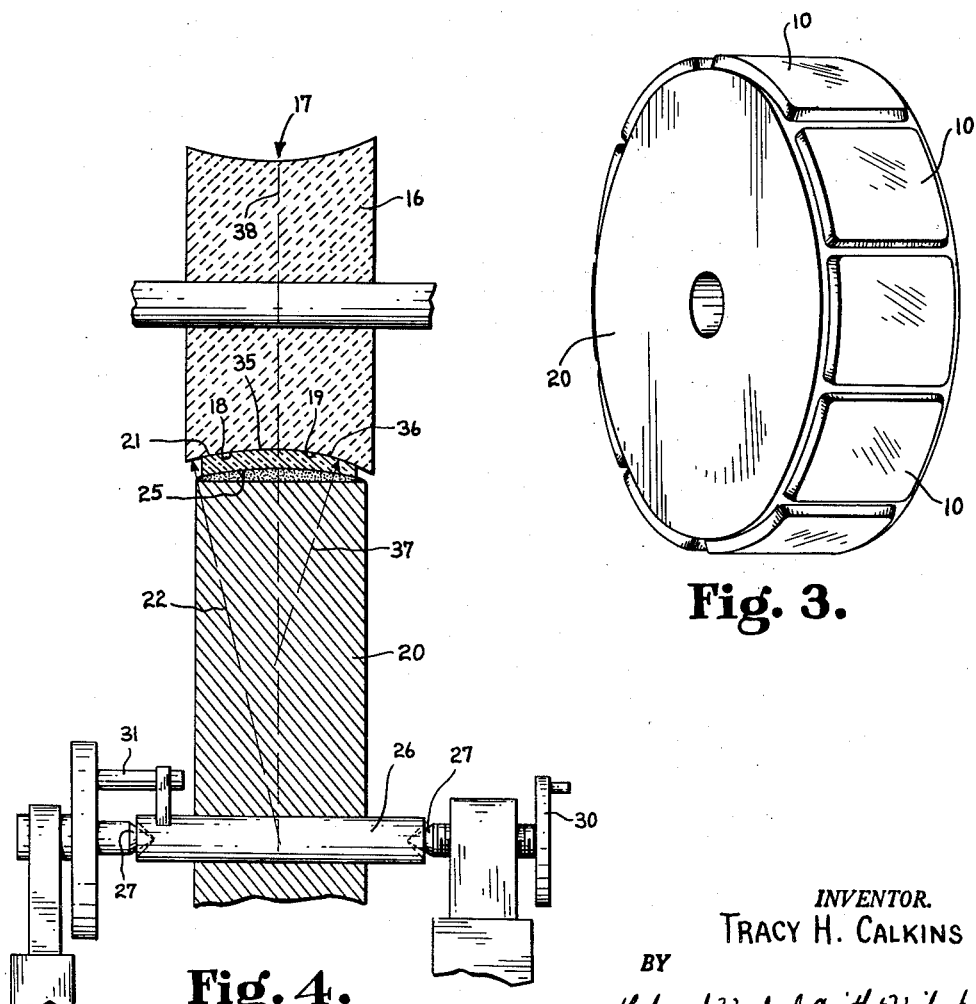
FIG. 3 is a perspective view of a blocking wheel upon which the unfinished blanks are mounted for grinding.

Referring now to FIG. 3, the unfinished lens blanks 10 are blocked or mounted about the circumferential periphery of a blocking wheel 20, the conventional means of attaching the lenses to a blocking wheel being by the use of melted pitch. The radius of the wheel 20 is approximately equal to the desired spherical radius of the distance field or base curve so that after grinding has been completed by means of the grinding wheel 16, the shape of the distance field surface 21 of each lens blank will be spherical.

Figure 4:
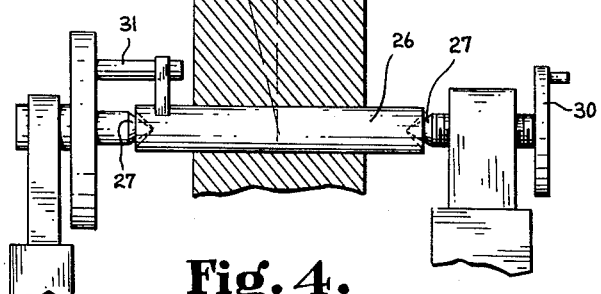
FIG. 4 is an enlarged central vertical section through a portion of the blocking wheel of FIG. 3 and additionally shows means for rotating the wheel and also a grinding wheel in position for rough grinding lens blanks upon the blocking wheel.

In other words, the blocking wheel 20 has a predetermined radius which may be added to the final thickness of the base curve portion of the lens to give the desired spherical radius of the distance field indicated at 22 in FIG. 4. Stated in another way, the concave surface 25 of each lens blank acts as a reference surface (whether it be in finished or in unfinished form) and the radial distance from the center of the blocking wheel to this reference surface plus the final thickness of the distance portion of the lens determines the spherical radius of the distance field.

The blocking wheel 20 is mounted upon a spindle 26 and the spindle 26 is then mounted between centers 27 by operation of crank 30 for rotation by driving means 31 whereby the blocking wheel 20 may be rotated about its axis. The blocking wheel is accurately positioned on the centers 27 in such a manner that the exact midpoint of the grinding wheel surface is in alignment with the midpoint of the blocking wheel 20 and the midpoints of the outer surfaces of the lens blanks mounted thereon. The grinding wheel 16 and blocking wheel 20 are rotated and brought together as illustrated in FIG. 4 and the lens blanks are ground until each of the blanks has a spherical distance field or base curve 35 formed thereon. It should be noted that the surface 36 formed upon the near field portions of the lens blanks will not be spherical in shape but will have a cross radius 37 which is equal to the desired spherical radius of the near field. Because of the manner of forming the grinding wheel 16 and because of the other above described procedures, the centers of the radii 22 and 37 will be located on a line 38 extending through the center of the grinding wheel 16 and the center of the blocking wheel 20.

After the rough grinding operation has been completed, the double toric grinding wheel 16 is removed from the surfaces of the lens blanks. The distance field portions 35 of the lenses are then finish ground on the same blocking wheel by means of rotatable finish grinding wheel 40 which has a circumferential peripheral surface 41 with a radius of cross-curvature 42 equal to the desired spherical radius of the distance field. The center of this radius 42 is located precisely at the center of the blocking wheel when this finish grinding has been completed. The surface 43 of the grinding wheel 40 extends a slight distance beyond the center of the blocking wheel 20 and the corresponding centers of the lens blanks blocked thereon.

Both the grinding wheel 40 and the blocking wheel 20 with its lens blanks are rotated and brought together to the position illustrated in FIG. 5 until the desired finish ground spherical surface is formed on the distance vision field of each lens blank. Final polishing of the thus ground distance vision field is accomplished in conventional manner after such distance field finish grinding.

The lens blanks are then deblocked and reblocked upon a blocking wheel 45 (FIG. 6) having a radius approximately equal to the desired spherical radius of the near field. That is, the blocking wheel 45 has a predetermined radius which may be added to the final thickness of the add curve portion of the lens to give the desired spherical radius of the near field. By operation of crank 46, the spindle 47 of the blocking wheel 45 is positioned on centers 50 for rotation by rotating means 51 about the axis of the blocking wheel. The blocking wheel is rotated about its axis and a dispenser 52 of any conventional type is operated to deposit a ribbon 55 of hardenable cement upon the convex surfaces of the lens blanks at the juncture of the near and distance fields.

In one embodiment of the present invention, the hardenable cement 55 comprises epoxy resin. The essential features necessary in the material 55 are that it become hard and firmly adherent to the outer convex surfaces of the lenses. One preferred embodiment of this material is Metalset A4 compound which is manufactured by the Smooth-On Manufacturing Company of Jersey City, New Jersey. This material includes in one part; epoxy resin, reactive modifier, clay silica and aluminum, this part being mixed with a second part which includes; polyamide amine, amine adduct, asbestos, clay, and titanium dioxide.

It will be obvious that such a composition, the two parts of which are mixed immediately prior to application to the lens blanks, is actually merely one form of commercially available epoxy resin cement. Preferably, the epoxy resin ribbon upon each lens blank has a thickness between $1/16$ and $3/32$ of an inch and is about $1/4$ inch wide. The minimum possible or desirable thickness for practicing the invention, however, is believed to be approximately .030 inch and the minimum possible or desirable width $3/16$ of an inch. Also, the epoxy resin ribbon 55 should be applied to the lens surfaces when they are in a dust free condition.

As will be described below, the next step of the present process is to grind through the epoxy resin ribbon in order to finish form the near vision field of the lens. The function of the epoxy resin is to prevent or reduce chips from occurring in the shoulder forming the junction of the near and distance fields. It should be emphasized that the important features of the material making up this ribbon are that it be hard and adherent. Reference is made to "Epoxy Resins," by Irving Skeist, published by the Reinhold Publishing Corporation of New York (copyright 1958) for further examples of possible epoxy resins. Various substances have been tried without success, those materials being pitch, shellac, household cement known as Duco, casein, wax, rosin, estergum, lacquer and vinyl.

Figure 7:
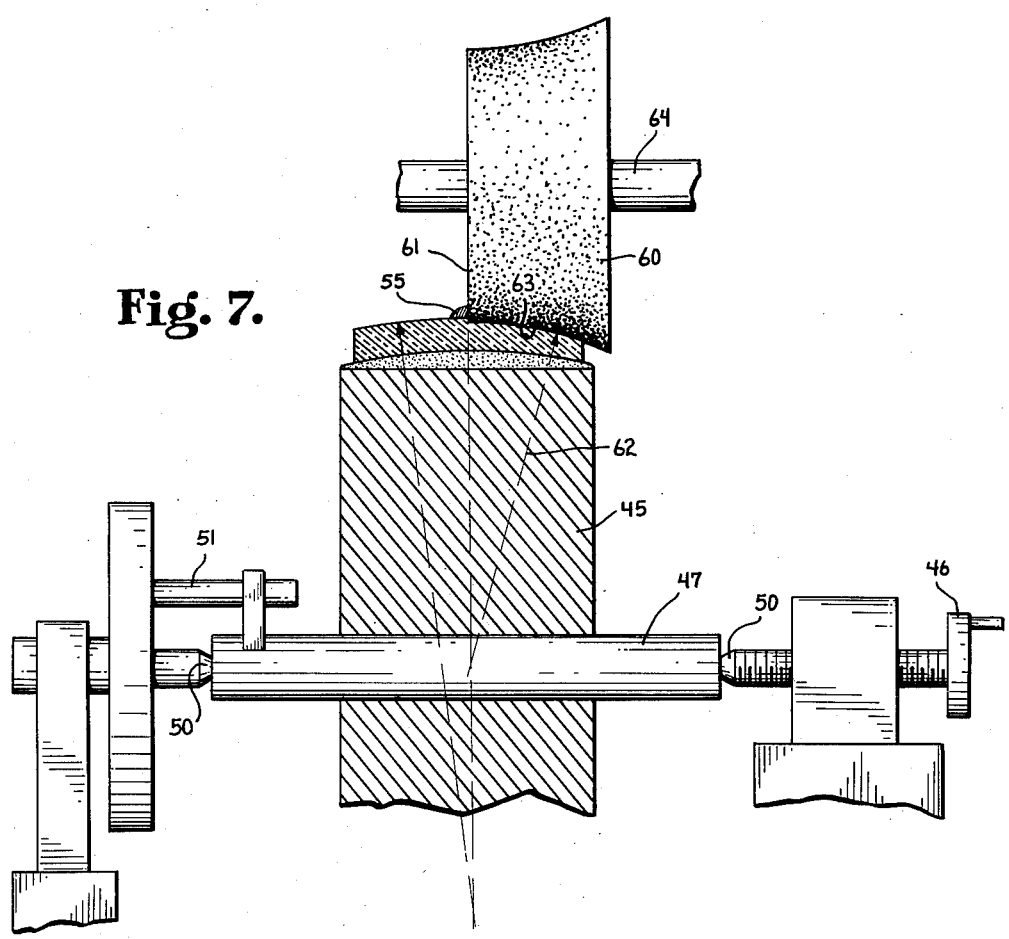
FIG. 7 is a central vertical section through a portion of the further blocking wheel and additionally shows means for rotating the wheel and also a further grinding wheel in position for finish grinding the near vision field or add curve of lens blanks mounted upon the wheel.

A finish grinding wheel 60 is then postioned in such a manner that the midpoints of the lenses are aligned with the edge 61 thereof. The grinding wheel 60 has a concave peripheral surface 63 which has a radius 62 of cross-curvature equal to the desired spherical radius of the near vision field or add curve. The grinding wheel 60 is rotated about its axis and on spindle 64; the blocking wheel 45 is rotated about its axis and the grinding wheel and blocking wheel are brought together as illustrated in FIG. 7 for finish grinding the near field of the lens to a spherical shape. It will be obvious that this grinding will be accomplished through the ribbon 55 of epoxy resin which prevents or reduces the formation of chips in the shoulder defining the border between the near and distance fields.

Figure 8:
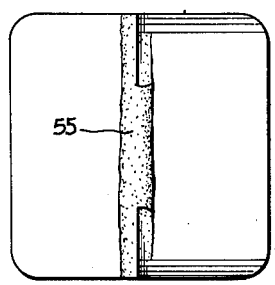
FIGS. 8, 9 and 10 are views showing the various stages of grinding of the near vision field or add curve of the lens blank upon the apparatus illustrated in FIG. 7.
Figure 9:
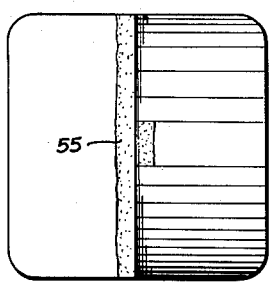
Figure 10:
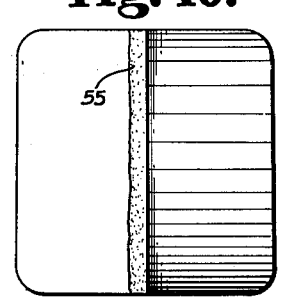

FIGS. 8-10 illustrate an important advantage of the use of a double toric rough grinding wheel. FIG. 8 shows a representative lens just after beginning of the grinding illustrated in FIG. 7. FIG. 9 shows the lens when grinding is nearly completed. FIG. 10 shows the completed spherical surface formed upon the near vision side of the lens blank. It can be seen from these figures (8, 9 and 10) that grinding does not proceed from the corners of the lens but instead proceeds from both sides of the lens to the center.

This effect occurs because the lens blanks were initially ground (FIG. 4) to provide a near vision portion having the proper cross-curvature instead of the same cross-curvature as that of the distance field. As a result, the entire curve of the wheel 60 engages the lens from the time that grinding begins until the entire near field is completely ground. Thus, the grinding wheel 60 will maintain its correct radius of cross-curvature for a relatively long period of time and the lens blanks ground thereby will have a more accurate spherical surface upon their near fields.

After such finish grinding of the near field has been completed, final polishing thereof is accomplished. Also, the remaining portion of the ribbon 55 (on the distance field) should be removed by means, for example, of a conventional trichlorethylene degreaser, this degreasing being accomplished prior to any polishing of the distance field.

Figures 12, 13, 16:
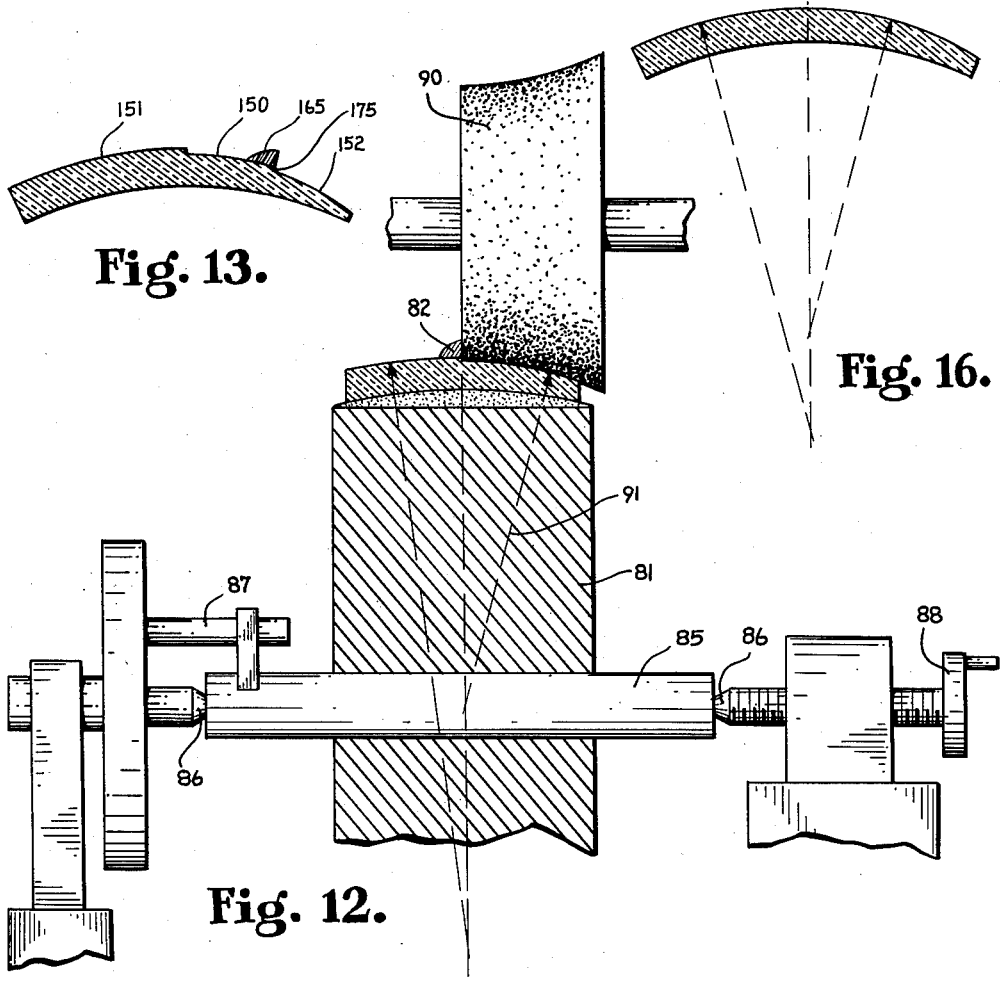
FIG. 12 is a view similar to FIG. 7 showing a step of the alternative method of FIG. 11.
FIG. 13 is a central section through a ground lens blank illustrating another alternative embodiment of the present invention.
FIG. 16 is a section taken along the line 16—16 of either FIGS. 14 or 15 in the direction of the arrows.

Referring to FIGS. 11 and 12, there is illustrated an alternative embodiment of the present invention which comprises blocking a plurality of unfinished lens blanks 69 similar to the lens blanks 10 about a blocking wheel 70 of the same dimension as the blocking wheel 20, the wheel 70 having a radius approximately equal to the desired spherical radius of the distance field. More specifically, the blocking wheel 70 has a predetermined radius which, when added to the final thickness of the base curve portion of the lens, provides the desired spherical radius of the distance field.

Similarly to the blocking wheel 20, the blocking wheel 70 is received upon spindle 71 and rotates between centers 72 under the action of driving means 75, the centers 72 being adjusted to mount the spindle by means of crank 76. A finish grinding wheel 77 having a cross-curvature at its circumferential periphery 80 equal to the desired spherical radius of the distance field is used to grind the lenses 69 which as mentioned have an initial shape similar to the shape illustrated in FIG. 1. The grinding wheel 77 and the blocking wheel 70 are rotated and brought together as illustrated in FIG. 12 and the lens blanks are ground until each of the blanks has a finish ground, spherical shape outer convex surface formed thereon.

The lens blanks are then deblocked and reblocked upon blocking wheel 81 having a radius approximately equal to the desired spherical radius of the near field. In the manner described above in connection with FIG. 6, a ribbon of epoxy resin 82 is placed upon the lens blanks at the juncture of the intended near field and distance field portions, this step being accomplished by spindle 85, centers 86, driving means 87, and crank 88. A grinding wheel 90 having a radius 91 of cross curvature equal to the desired spherical surface of the near field is then used to grind through the ribbon of epoxy resin 82 to finish grind the near field of the lenses, this grinding being accomplished by rotation of both the blocking wheel and the grinding wheel in the manner suggested in FIG. 12.

It can be appreciated that the last described embodiment of the process of the present invention can be carried further or extended to provide trifocal or any multifocal lens blanks by providing further grinding wheels similar to the grinding wheel 90, but proportioned to cover a lesser portion of the near field and having a more acute curvature or shorter radius of cross curvature. Such a procedure is suggested in FIG. 13, it being understood that prior to any particular grinding operation, the epoxy or hardenable cement is adhered to the intended juncture of the field already ground and the field to be ground.

Figure 17:
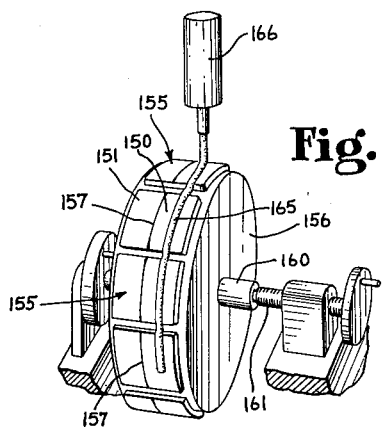
FIG. 17 is a perspective view similar to FIG. 6 of still a further blocking wheel and of a means for applying epoxy resin to the lens blanks on the wheel during rotation thereof.
Figure 18:
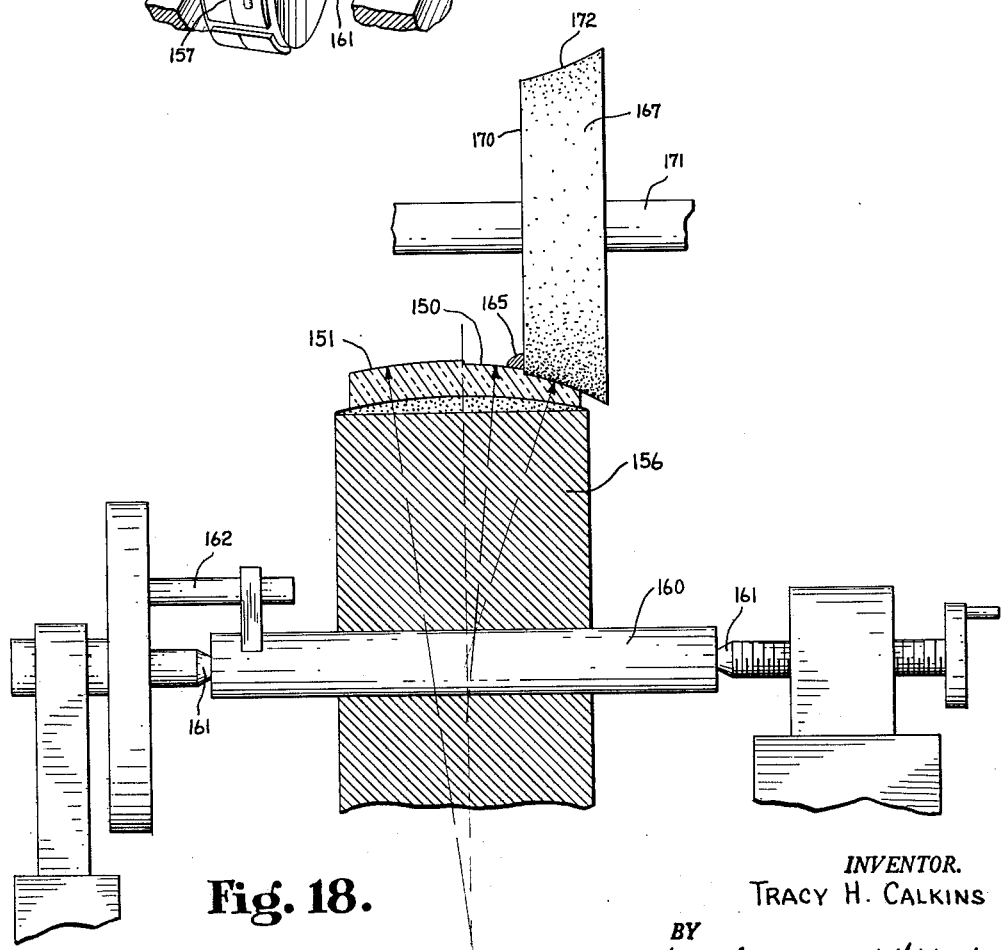
FIG. 18 is a central vertical section through a portion of the further blocking wheel of FIG. 17 and also shows a further grinding wheel in position for finish grinding the near vision field of lens blanks mounted on the wheel.

Referring to FIGS. 13, 17 and 18, the following steps might be used in practicing the invention to form a trifocal lens blank. By use of either the process described and shown in the above mentioned Calkins et al. patent or the process described and shown in the above mentioned Catron et al. application or by any of the processes described and shown in the present application, a plurality of finished bifocal blanks are formed. An example of such a finished bifocal blank is illustrated in FIG. 2 and has been described above. It will be remembered that the field or portion 13 has been described as the reading portion or near portion. In the present process, the portion 13 of the lens should have, as a result of previous grinding and polishing operations, a finished surface with a proper spherical radius for the intermediate portion 150 (FIG. 13) of the lens. As a result of the further steps described below, the final trifocal lens blank of FIG. 13 has a distance portion 151, an intermediate portion 150 and a reading portion 152 which usually has a power equal to twice the power of the intermediate portion.

In order to insure that the present description is clear, it should be understood that the present process is practiced by first forming the structure of FIG. 2 by the "Calkins" process, the "Catron" process or any of the processes herein described but the portion 13 of FIG. 2 will have a finished spherical shape the radius of which will be equal to the desired radius for the intermediate field.

A plurality of so formed blanks 155 are blocked about the circumferential periphery of a blocking wheel 156 having a radius approximately equal to the desired spherical radius of the near field 152. In other words, the blocking wheel 156 has a predetermined radius which may be added to the final thickness of the near field portion 152 of the lens to give the desired spherical radius of the near field. Each of the lens blanks is arranged with the shoulders 157 (dividing the distance field from the intermediate field) extending in the direction of rotation of the blocking wheel and with the distance fields 151 all on the same side of the blocking wheel as illustrated. By use of spindle 160, centers 161 and driving means 162 similar to above described structure, the blocking wheel 156 is rotated and a ribbon 165 of epoxy is deposited by the dispenser 166 exactly as above described regarding FIG. 6 with the exception that ribbon 165 is deposited at the intended juncture of the intermediate and near fields 150 and 152 respectively, this intended juncture in the illustrated embodiment being approximately halfway between shoulder 157 and the edge of the lens blank. Preferably, however, the intended juncture is spaced from the shoulder 157 approximately one-fourth of the distance between the shoulder 157 and the edge of the lens blank although clearly other arrangements are operable.

A finish grinding wheel 167 is then positioned in such a manner that its edge 170 is located in a plane defined by the intended juncture of the near and intermediate fields of each lens blank 155. The axis of spindle 160 is parallel to the axis of spindle 171 mounting the grinding wheel 167. The grinding wheel 167 has a concave peripheral surface 172 which has a radius of cross-curvature equal to the desired spherical radius of the near vision field 152. The grinding wheel 167 is rotated about its axis and on spindle 171; the blocking wheel 156 is rotated about its axis, and the grinding wheel and blocking wheel are brought together as illustrated in FIG. 18 for finish grinding the near field of the lens to a spherical shape. It will be obvious that this grinding will be accomplished through the ribbon 165 of epoxy resin which prevents or reduces the formation of chips in the shoulder 175 (FIG. 13) defining the border between the near and intermediate fields. The near field 152 of each lens blank is final polished to complete the finished trifocal lens blanks and the remaining portion of the ribbon 165 is cleaned from each lens blank.

Figures 14, 15:
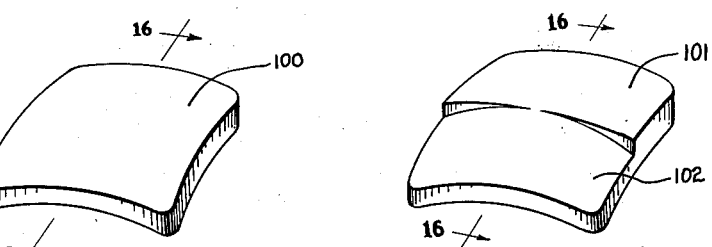
FIG. 14 is a perspective view of an unfinished molded lens blank used in a further alternative embodiment of the present invention.
FIG. 15 is a perspective view of an unfinished molded lens blank used in still another alternative embodiment of the present invention.

Various further alternatives of the present invention can be conceived and all will not be described herein. Referring, however, to FIGS. 14–16, there are illustrated a pair of unfinished lens blanks in a form which they might be conventionally press molded prior to arrival at the grinding location. The lens blank illustrated in FIGS. 14 and 16 has a molded shape such as might be produced by the grinding of FIG. 4. Thus, the step of FIG. 4 would not be necessary and would be eliminated. The first grinding operation accomplished would be that of FIG. 5 and the remainder of the alternative process of FIGS. 14 and 16 would include the various steps above described with regard to the first embodiment of applicant's process.

In FIGS. 15 and 16, there is illustrated another unfinished lens blank which has a molded convex shape including two surfaces 101 and 102 each of which has a spherical curvature equaling as nearly as possible the desired spherical curvature of the distance and near fields of the final product. Thus, in the alternative embodiment of FIGS. 15 and 16, the method steps would include the above described steps of the first embodiment starting with the step illustrated in FIG. 5 and proceeding on until the first described embodiment is completed.

From the above description, it can be appreciated that the present invention provides an improved method of making lenses which eliminates steps previously thought to be necessary in forming lenses. Perhaps more importantly, the present invention provides an improved method of forming glass which eliminates or reduces chipping or flaking in the grinding of the glass.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. A method of making one-piece multifocal lens blanks having distance and near fields of vision separated by straight line shoulders which comprises grinding the distance field of an unfinished blank to a spherical shape and simultaneously grinding the near field of said blank to a radius of cross curvature approximating the desired spherical radius of the near field, applying only a ribbon of hard adhesive at the juncture of the distance and near fields, and then grinding the near field portion of said blank through said hard adhesive to a spherical shape.

2. A method of making one-piece multifocal lens blanks having distance and near fields of vision separated by straight line shoulders which comprises rough grinding the distance field of a plurality of unfinished blanks to a spherical shape and simultaneously grinding the near field of said blanks to a radius of cross curvature approximating the desired spherical radius of the near field, finishing the distance field to a spherical shape, applying only a ribbon of epoxy resin at and covering the juncture of the distance and near fields, and grinding through said ribbon and finishing the near field portions of said blanks to a spherical shape.

3. A method of making one-piece multifocal lens blanks having distance and near fields of vision separated by straight line shoulders which comprises blocking a plurality of unfinished blanks about the peripheral surface of a blocking wheel, said wheel having a radius approximating the desired radius of the distance field, applying to said blanks a rotating grinding wheel having a concave peripheral grinding surface which is formed to the shape of two merging toric sections, one of said sections having a cross radius approximating the desired spherical radius of said distance field and the other of said sections having a cross radius approximating the desired spherical radius of said near field, rotating said blocking wheel until the distance field of each blank is formed to a spherical surface, applying to the distance field portions of said blanks a rotating grinding wheel with a radius of cross curvature corresponding to the radius of said distance fields of vision, rotating said blocking wheel and grinding each lens blank in succession until the distance field of each blank is finish ground to a spherical surface, deblocking said blanks and blocking them about the periphery of a second blocking wheel having a radius approximating the desired radius of the near field, applying to said blanks a ribbon of epoxy resin at the juncture of the distance and near fields, applying to the near field portions of said blanks a second grinding wheel with a radius of cross curvature corresponding to the radius of said near field of vision, and rotating said second wheels and grinding each blank in succession through said ribbon of epoxy resin until the near field of each blank is finish ground to a spherical surface.

4. A method of making one-piece multifocal lens blanks having distance and near fields of vision separated by straight line shoulders which comprises forming an unfinished blank at its distance field with a spherical shape and at its near field with a toric shape having a radius of cross curvature approximating the desired spherical radius of the near field, applying only a ribbon of hard adhesive at and covering the juncture of the distance and near fields, and then grinding the near field portion through said ribbon of said blank to a spherical shape.

5. A method of making one-piece multifocal lens blanks having distance and near fields of vision separated by straight line shoulders which comprises molding an unfinished blank to have a spherically shaped distance field and a torically shaped near field having a radius of cross curvature approximating the desired spherical radius of the near field, finishing the distance field to a spherical shape, applying only a ribbon of epoxy resin and covering at the juncture of the distance and near fields, and grinding through said ribbon and finishing the near field portions of said blanks to a spherical shape.

6. A method of making one-piece multifocal lens blanks having distance and near fields of vision separated by straight line shoulders which comprises blocking a plurality of molded unfinished blanks about the peripheral surface of a blocking wheel, said wheel having a radius approximating the desired radius of the distance field, said molded blanks having a spherically shaped distance field and a torically shaped near field having a radius of cross curvature approximating the desired spherical radius of the near field, applying to the distance field portions of said blanks a rotating grinding wheel with a radius of cross curvature corresponding to the radius of said distance fields of vision, rotating said blocking wheel and grinding each lens blank in succession until the distance field of each blank is finish ground to a spherical surface, deblocking said blanks and blocking them about the periphery of a second blocking wheel having a radius approximating the desired radius of the near field, applying to said blanks a ribbon of epoxy resin at the juncture of the distance and near fields, applying to the near field portions of said blanks a second grinding wheel with a radius of cross curvature corresponding to the radius of said near field of vision, and rotating said second wheels and grinding each lens blank in succession through said ribbon of epoxy resin until the near field of each blank is finish ground to a spherical surface.

7. A method of making one-piece multifocal lens blanks having distance and near fields of vision separated by a straight line shoulder which comprises molding an unfinished blank to have a distance field and a near field each of which is molded to the approximate desired spherical shape of the particular field, finish grinding the distance field, applying only a ribbon of hard adhesive at and covering the juncture of the distance and near fields, and finish grinding the near field through said ribbon.

8. A method of making one-piece multifocal lens blanks having distance and near fields of vision separated by straight line shoulders which comprises blocking a plurality of molded unfinished blanks about the peripheral surface of a blocking wheel, said wheel having a radius approximating the desired radius of the distance field, said molded blanks having a distance field and a near field each of which is molded to the approximate desired spherical shape of the particular field, applying to the distance field portions of said blanks a grinding wheel with a radius of cross curvature corresponding to the radius of said distance fields of vision, rotating said wheels and grinding each lens blank in succession until the distance field of each blank is finish ground to a spherical surface, deblocking said blanks and blocking them about the periphery of a second blocking wheel having a radius approximating the desired radius of the near field, applying to said blanks a ribbon of epoxy resin at the juncture of the distance and near fields, applying to the near field portions of said blanks a second grinding wheel with a radius of cross curvature corresponding to the radius of said near field of vision, and rotating said second wheels and grinding each lens blank in succession through said ribbon of epoxy resin until the near field of each blank is finish ground to a spherical surface.

9. A method of making a trifocal lens blank having distance, intermediate and near fields of vision separated by straight line shoulders which comprises blocking a plurality of blanks about the peripheral surface of a blocking wheel, said blanks having a distance field and an intermediate field each of which is finished to the desired spherical shape of the particular field, said blocking wheel having a radius approximating the desired radius of the near field, applying to said blanks a ribbon of epoxy resin at the intended juncture of the intermediate and near fields, applying to the near field portions of said blanks a grinding wheel with a radius of cross curvature corresponding to the desired radius of said near field of vision, and rotating said wheels and grinding each blank in succession through said ribbon of epoxy resin until the near field of each blank is finish ground to a spherical surface.

References Cited in the file of this patent

UNITED STATES PATENTS

| 1,729,459 | Silge | Sept. 24, 1929 |
| 2,936,674 | Beasley | May 17, 1960 |